United States Patent
Jubran et al.

(10) Patent No.: US 10,581,756 B2
(45) Date of Patent: Mar. 3, 2020

(54) NONINTRUSIVE DYNAMICALLY-SCALABLE NETWORK LOAD GENERATION

(71) Applicant: MICROSOFT CORPORATION, Redmond, WA (US)

(72) Inventors: Marwan E. Jubran, Redmond, WA (US); Aleksandr Mikhailovich Gershaft, Redmond, WA (US); Weiping Hu, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 826 days.

(21) Appl. No.: 14/481,165

(22) Filed: Sep. 9, 2014

(65) Prior Publication Data
US 2016/0072730 A1 Mar. 10, 2016

(51) Int. Cl.
*G06F 15/173* (2006.01)
*G06F 15/16* (2006.01)
(Continued)

(52) U.S. Cl.
CPC ........ *H04L 47/822* (2013.01); *H04L 41/0896* (2013.01); *H04L 41/14* (2013.01);
(Continued)

(58) Field of Classification Search
CPC ..... H04L 41/0896; H04L 41/14; H04L 43/08; H04L 43/12; H04L 43/50; H04L 47/822
(Continued)

(56) References Cited

U.S. PATENT DOCUMENTS

| 6,112,225 A * | 8/2000 | Kraft | G06F 9/5072 |
| | | | 709/201 |
| 6,601,020 B1 * | 7/2003 | Myers | G06F 11/3414 |
| | | | 455/67.14 |

(Continued)

FOREIGN PATENT DOCUMENTS

CN 103002005 A 3/2013

OTHER PUBLICATIONS

Bluelock. "Managing Cost in the Cloud." May 29, 2012. 7 pages.*
(Continued)

*Primary Examiner* — Karen C Tang
(74) *Attorney, Agent, or Firm* — Shook, Hardy & Bacon, L.L.P.

(57) ABSTRACT

A method for nonintrusive network load generation may include determining available resources in a distributed computing system, where the distributed computing system includes a plurality of computing devices and a target deployment. Based on an amount of available resources between the target deployment and a plurality of source computing devices, the plurality of source computing devices may be selected to generate a network load directed from the plurality of source computing devices to the target deployment. The plurality of source computing devices may be a subset of the plurality of computing devices in the distributed computing system. A network-traffic generator service may be provided to the plurality of source computing devices in order to generate the network load directed from the plurality of source computing devices to the target deployment. The performance of the distributed computing system in response to the generated network load may be monitored.

20 Claims, 6 Drawing Sheets

(51) Int. Cl.
  *H04L 12/911* (2013.01)
  *H04L 12/26* (2006.01)
  *H04L 12/24* (2006.01)
(52) U.S. Cl.
  CPC .............. *H04L 43/08* (2013.01); *H04L 43/50* (2013.01); *H04L 43/12* (2013.01)
(58) Field of Classification Search
  USPC .................................................. 709/224, 231
  See application file for complete search history.

(56) References Cited

U.S. PATENT DOCUMENTS

| | | | |
|---|---|---|---|
| 7,921,205 B2 | 4/2011 | Shen et al. | |
| 8,719,415 B1* | 5/2014 | Sirota ................... | G06F 9/5061 709/221 |
| 8,726,243 B2 | 5/2014 | Nasuto et al. | |
| 8,977,903 B1* | 3/2015 | Chandrasekharapuram ................ | G06F 11/263 714/32 |
| 8,984,341 B1* | 3/2015 | Chandrasekharapuram ................ | G06F 11/263 714/32 |
| 9,110,496 B1* | 8/2015 | Michelsen ................ | G06F 1/00 |
| 9,229,845 B1* | 1/2016 | Chandrasekharapuram ................ | G06F 11/3672 |
| 9,329,915 B1* | 5/2016 | Chandrasekharapuram ................ | G06F 11/00 |
| 2003/0033406 A1 | 2/2003 | John et al. | |
| 2004/0039550 A1* | 2/2004 | Myers ................. | G06F 11/3414 702/186 |
| 2007/0083630 A1* | 4/2007 | Roth ................... | G06F 11/3688 709/223 |
| 2010/0332479 A1* | 12/2010 | Prahlad .............. | G06F 17/3002 707/741 |
| 2011/0202645 A1 | 8/2011 | Abdelal et al. | |
| 2012/0185913 A1* | 7/2012 | Martinez ................. | G06F 9/455 726/1 |
| 2013/0054792 A1 | 2/2013 | Sharaf | |
| 2013/0080617 A1* | 3/2013 | Driesen .............. | H04L 43/0876 709/224 |
| 2013/0262931 A1 | 10/2013 | Siddalingesh | |
| 2013/0268520 A1* | 10/2013 | Fisher ................... | G06F 16/248 707/723 |
| 2014/0026122 A1 | 1/2014 | Markande et al. | |
| 2014/0033055 A1 | 1/2014 | Gardner et al. | |
| 2014/0068335 A1* | 3/2014 | Bromley ................. | H04L 43/50 714/32 |
| 2014/0215271 A1* | 7/2014 | Oh ...................... | G06F 11/3668 714/31 |
| 2014/0325275 A1* | 10/2014 | Oh ...................... | G06Q 30/018 714/25 |
| 2015/0127611 A1* | 5/2015 | Westerman ......... | H04L 41/5003 707/639 |

OTHER PUBLICATIONS

Web Performance, Inc. "Web Performance Load Tester", manual, version 3.5. Mar. 5, 2013. 310 pages.*
David Rosen. "Advanced Build Cloud resource partitioning and prioritization" in 'Electric Cloud'. Dated Nov. 20, 2012. 7 pages. Available online: http://electric-cloud.com/blog/2012/11/advanced-build-cloud-resource-partitioning-and-prioritization/.*
Demento et al. "How to simulate DDoS attacks from the Internet?" Oct. 12, 2011-Mar. 25, 2012. 4 pages. Archived May 1, 2013. Available online: https://web.archive.org/web/20130501205147/http://security.stackexchange.com/questions/8072/how-to-simulate-ddos-attacks-from-the-internet.*
"Citrix® EdgeSight for Load Testing User's Guide" published Sep. 28, 2010; http://support.citrix.com/servlet/KbServlet/download/25622-102-666168/eslt-u-guide.pdf; 86 pages.
"International Search Report & Written Opinion Issued in PCT Application No. PCT/US2015/048747", dated Dec. 11, 2015, 14 Pages.
"Second Written Opinion Issued in PCT Application No. PCT/US2015/048747", dated Jul. 20, 2016, 8 Pages.
"International Preliminary Report on Patentability Issued in PCT Application No. PCT/US2015/048747", dated Dec. 12, 2016, 9 Pages.
"First Office Action and Search Report Issued in Chinese Patent Application No. 201580059805.6", dated Jul. 22, 2019, 31 Pages.

* cited by examiner

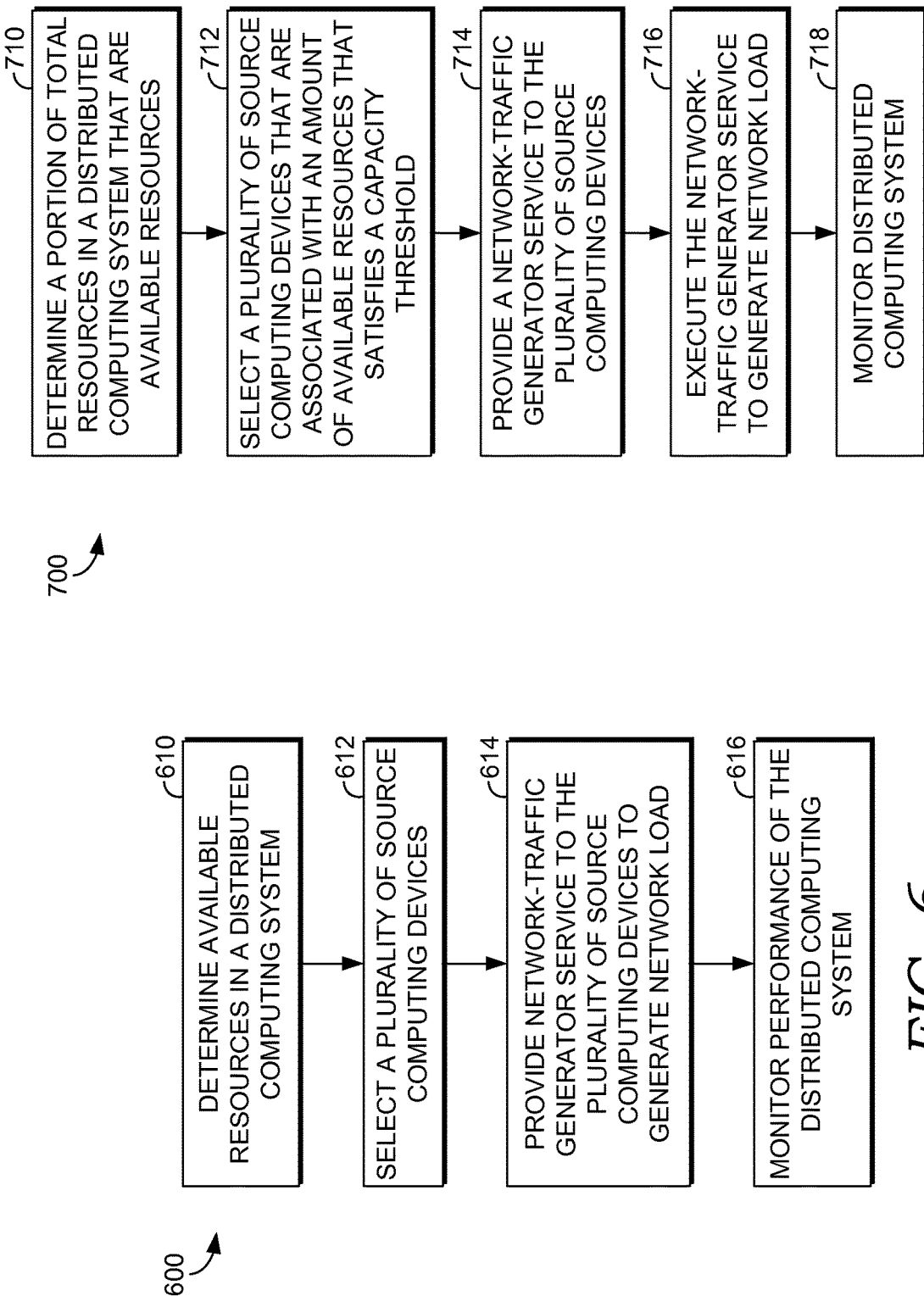

NONINTRUSIVE DYNAMICALLY-SCALABLE NETWORK LOAD GENERATION

BACKGROUND

In a distributed computing system, a new or modified deployment of compute or storage clusters may call for a particular capacity or throughput. Prior to releasing this deployment to a customer, testing is needed to ensure that the network connectivity provided to the deployment is sufficient to meet a specified level of service.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments hereof provide methods, systems, and computer storage media for performing nonintrusive dynamically-scalable network load generation. This may be done to validate network connectivity for a new and/or existing cloud infrastructure, such as a deployment of a storage or a compute cluster (e.g., a plurality of computing devices), in a distributed computing system. Network connectivity may include, for example, network bandwidth and network latency (e.g., a bandwidth and latency specified in a service level agreement with a customer). The load generation may also be performed to simulate a denial-of-service ("DoS") attack and ensure that various network components manage the simulated DoS attack gracefully.

In order to generate the network load that targets the desired cloud infrastructure, a network-traffic generator service may be executed at multiple source computing devices across different source sites, such as different data centers. The computing devices selected to generate the network load may be selected based on resources, such as bandwidth and compute capacity, available at the computing devices. Specifically, available resources (e.g., resources that are not being used to support live operations) may be determined, and a computing device may be selected to serve as a source computing device based on its association with a certain amount of available resources. In this way, the network load used for testing may be generated with un-used, or "spare," resources in the network, and the network load may be generated in parallel with live network traffic. This use of available resources enables the network load to be generated in a nonintrusive manner, such that the generation does not interrupt live network traffic that is supporting the live operations of other customers.

Initially, the generated network load may be relatively small. If the distributed computing system performs satisfactorily in response to this load, the size of the load may be increased. The network load may then be incrementally increased until the load is sufficient to validate a desired level of network connectivity and/or simulate a DoS attack at the target infrastructure. As the load is increased, the source computing devices used to generate the load may change and/or additional source computing devices may be employed. Additionally, existing source computing devices may be released back to reduce resource usage. In this way, the magnitude of the load may be dynamically scalable, and the origin points of the network load may be dynamically selected. The size of the network load may be dynamically scaled within each specific source site, as well as across multiple source sites.

The distributed computing system may be monitored at each incremental network load that is generated. This monitoring may include generating reference points that indicate the performance of various system components at different network loads. The monitoring may further include monitoring performance metrics during the load generation to determine whether the distributed computing system is performing satisfactorily in response to the generated network load.

If performance problems occur during testing, such as network failures or failures at the target infrastructure, the network load may be reduced and/or eliminated. Additionally if the compute capacity of the existing source computing devices is needed, the existing origin points may be reduced and/or eliminated. Thus, the magnitude of the load may be dynamically scalable based on various performance metrics. Automatic throttling may prevent live traffic incidents.

BRIEF DESCRIPTION OF THE DRAWINGS

Embodiments hereof are described in detail below with reference to the attached drawing figures, wherein:

FIG. 6 is a flow diagram showing an exemplary method for nonintrusive network load generation, in accordance with embodiments hereof; and FIG. 7 is a flow diagram showing an exemplary method for nonintrusive network load generation, in accordance with embodiments hereof.

DETAILED DESCRIPTION

Figure 1:
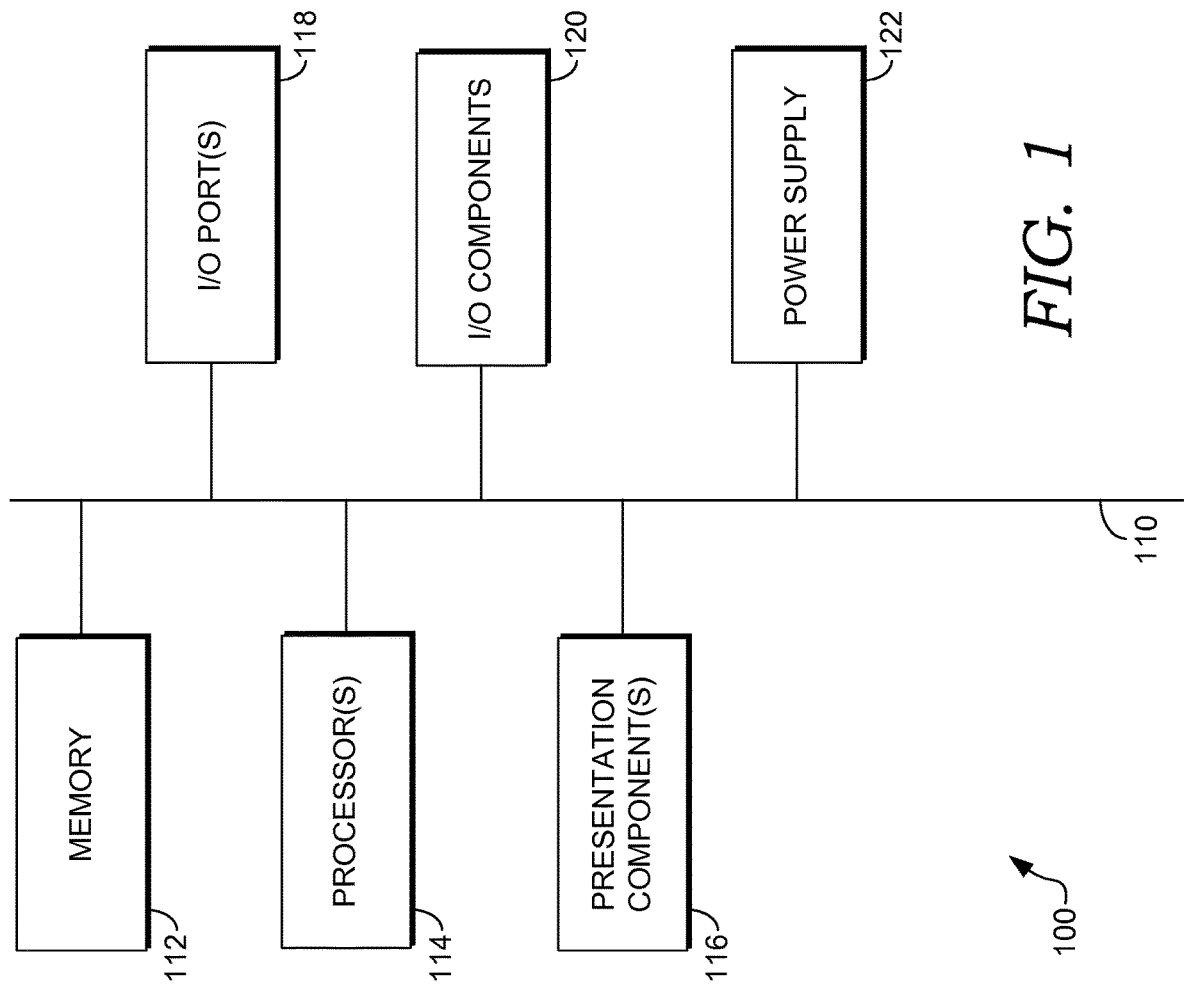
FIG. 1 is a block diagram of an exemplary computing environment suitable for use in implementing embodiments hereof.

The subject matter of embodiments hereof is described with specificity herein to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

Embodiments hereof provide methods, systems, and computer storage media for performing nonintrusive dynamically-scalable network load generation. This generated load may be used to validate network connectivity for a new and/or existing cloud infrastructure, such as a deployment of compute and/or storage infrastructure. For example, network connectivity may be validated at a storage infrastructure, such as a "storage cluster" or a "storage stamp." A certain level of network connectivity may be needed at a storage cluster in order to meet a particular level of service that is to be provided under service level agreements ("SLAs") with various customers. In some instances, a storage cluster is a dedicated storage cluster, to which one customer has exclusive access. In this case, a certain level of network connectivity may be needed at the storage cluster in order meet that particular customer's requirements under an SLA with that customer. Thus, before releasing a storage cluster to a customer or customers (e.g., "going live" with the storage cluster), an end-to-end test that simulates customer behavior may be performed to ensure that the storage cluster is properly configured within the network infrastructure. The end-to-end test may also ensure that the network connectivity at the storage cluster is sufficient to comply with standards set forth in the SLA. For example, the testing may confirm that the storage cluster is associated with connectivity that provides sufficient bandwidth, latency, and/or throughput, and that also maintains latency and/or failures within acceptable levels, such as those set forth in the SLA. The end-to-end testing in a live environment, with live traffic flowing around the storage cluster, shows how the storage cluster will perform when it goes live. It should be noted that a storage cluster is just one example of a deployment that may be tested in accordance with embodiments hereof. Deployments of other infrastructure, such as a deployment of a compute cluster, may be tested for adequate network connectivity.

The network load generation may further be used to subject various components within the network infrastructure to a simulated DoS attack. A genuine DoS attack may include efforts to make a particular network component and/or resource unavailable to users by saturating the targeted component and/or resource with so many external requests that the component and/or resource cannot reasonably support legitimate traffic (e.g., the response time of the component and/or resource becomes very slow, such that it cannot support legitimate traffic). For example, a DoS attack may flood a network connection and/or fill a storage capacity. A simulated DoS attack, as described herein, may be performed in order to assess the response of various network components to the attack. This may be done in order to determine whether the components are configured to gracefully manage a genuine DoS attack. For example, a target deployment may be subjected to the simulated attack before the target deployment goes live. This simulation may ensure that the target deployment is configured to gracefully manage a genuine attack. Additionally or alternatively, the target deployment may be existing infrastructure, and the simulation may ensure existing infrastructure is configured to gracefully manage a genuine attack. Graceful management may include implementing a defensive response. Such defensive responses may include detecting an attack, responding to an attack with an appropriate tool, and/or preventing future attacks. Appropriate tools may include firewalls, switches, and routers. These tools may aid in blocking illegitimate traffic while allowing legitimate traffic.

In order to validate network connectivity within the network infrastructure and/or to simulate a DoS attack, large-scale network loads may be generated. For example, a load of 40 gigabytes per second may be needed to test network connectivity at a target storage cluster. Generating this large load may require the bandwidth and/or compute resources of multiple computing devices to minimize impact at the source of large network usage. For example, the sum of the resources available at multiple computing devices located at multiple data centers may be sufficient to generate the large load needed for testing. Thus, a plurality of computing devices across multiple source sites may be selected as source computing devices for generating the load.

Advantageously, the network load generation described herein enables a full-scale test (e.g., testing the load of 40 gigabytes per second) while minimizing interference with live operations. This is important for several reasons. First, the full-scale test ensures that the network infrastructure throughout the network pipeline is properly setup and/or configured for full-scale operations. In other words, the testing is not limited to local network infrastructure, as such small-scale testing would not reveal problems outside of the local infrastructure. Network devices manage both live traffic and the network traffic generated for testing purposes, which means that the network devices are tested for full-scale operations. Second, the present network load generation provides the advantage of full-scale testing in a live network environment without interfering with live network operations. Thus, the load-generation is "non-intrusive" and minimizes failures in live operations.

In particular, the nonintrusive network load generation aims to minimize compromising, or intruding upon, live traffic on the network. This may be accomplished by dynamically selecting the most appropriate set of source locations for generating the load. The appropriateness of a particular source location and/or a particular source computing device may be based on current network bandwidth between the source and the target deployment. The utilization of that network bandwidth (e.g., current utilization for live operations) and the remaining available capacity may also be considered. For example, the computing devices selected to source the network load generated for testing may be different from the computing devices that are currently supporting live operations. The use of available resources enables the network load to be generated in a nonintrusive manner, such that its generation does not interrupt live network traffic that is supporting the live operations of other customers. Based on the availability of network capacity and compute capacity, a network-traffic generator service may be deployed to geo-distributed source computing devices. The network-traffic generator service may be used to generate the network load.

Initially, the network load may be relatively small. The network load may then be incrementally increased until the load is sufficient to validate the desired level of network connectivity at the target service and/or to simulate a DoS attack of the desired scale. As the load is increased, the source computing devices used to generate the load may change and/or additional source computing devices may be employed. In this way, the magnitude of the load may be dynamically scalable, and the origin points of the network load may be dynamically selected.

While the load generation is being performed, the distributed computing system may be monitored. For example, various metrics for the network-traffic generator service, health metrics for the network, and metrics for the target deployment may be monitored. These monitored metrics may serve as reference points for the performance of the distributed computing system at a particular network load. For example, the reference points may provide snapshots of the distributed computing system performance at any number of network loads. These reference points may be used to understand how the distributed computing system behaves at various loads. The reference points may be used to evaluate whether additional network load may be generated while continuing to meet current SLAs with customers, as well as to help set expectations for future performance of the distributed computing system.

Additionally, based on the monitoring of the distributed computing system performance in response to the generated network load, the network load may be dynamically scaled across the source computing devices. For example, the load may be scaled up and/or down at various source computing devices. This monitoring and associated scaling may aid in minimizing disruptions and costs.

If problems occur during testing, such as network failures or failures at the target deployment, the network load may be reduced and/or eliminated. Again, in this way, the magnitude of the load may be dynamically scalable based on various performance metrics. Dynamic scaling may prevent resource exhaustion. Additionally, automatic throttling may accommodate a reduction in available resources (e.g., network bandwidth and/or compute capacity) at a source computing device and/or prevent live traffic incidents. In some instances, Microsoft® Azure is used for scalability and geographic distribution, which may allow the testing to utilize un-used, or "spare," bandwidth and compute capacity.

Advantageously, this end-to-end testing in a live network environment allows for the detection of errors across an entire distributed computing system. Additionally, the end-to-end testing in a live environment combines real-world behaviors of components in the distributed computing system with a simulated network load. For example, a network load generated using the network-traffic generator service may be generated from different locations and arrive at different times at a target deployment, and the network load may also be processed through the distributed computing system in parallel with live network traffic.

Accordingly, one exemplary embodiment is directed to a computer-implemented method for nonintrusive network load generation. The method may include determining available resources in a distributed computing system. The distributed computing system may include a plurality of computing devices and a target deployment. The deployment may include, for example, a cluster of computing devices, such as a storage and/or compute cluster. Based on an amount of available resources between the target deployment and a plurality of source computing devices, the plurality of source computing devices may be selected to generate a network load directed from the plurality of source computing devices to the target deployment. The plurality of source computing devices may comprise a subset of the plurality of computing devices in the distributed computing system. The method may further include providing a network-traffic generator service to the plurality of source computing devices in order to generate the network load directed from the plurality of source computing devices to the target deployment. A performance of the distributed computing system may be monitored, where the performance is in response to the generated network load.

Another exemplary embodiment is directed to one or more computer storage media having computer-executable instructions embodied thereon that, when executed, perform a method for nonintrusive network load generation. The method may include determining a portion of total resources in a distributed computing system that is available resources. The available resources may include compute capacity and network bandwidth capacity associated with computing devices in the distributed computing system. Additionally, the method may include selecting a plurality of source computing devices associated with an amount of available resources, where the amount of available resources satisfies a predetermined capacity threshold. A network-traffic generator service may be provided to the plurality of source computing devices. The network-traffic generator service may then be executed in order to generate a first network load directed from the plurality of source computing devices to a target deployment. The first network load may be communicated concurrently with ongoing network activities associated with live operations. Finally, the method may include monitoring the distributed computing system to assess a performance of the distributed computing system in response to the first network load.

In yet another embodiment, a system for nonintrusive, dynamically-scalable network load generation is provided. The system may include a plurality of source computing devices associated with a compute capacity and a network bandwidth capacity. The system may also include a target deployment. Additionally, the system may include a validation server. The validation server may be configured to select the plurality of source computing devices to generate a network load directed from the plurality of source computing devices to the target deployment. Selecting the plurality of source computing devices may be based on an amount of available resources between the plurality of source computing devices and the target deployment. The validation server may further be configured to provide a network-traffic generator service to the plurality of source computing devices in order to generate the network load and then monitor a performance of the system in response to the generated network load.

Having briefly described an overview of embodiments hereof, an exemplary operating environment in which embodiments hereof may be implemented is described below in order to provide a general context for various aspects. Referring initially to FIG. 1 in particular, an exemplary operating environment for implementing embodiments hereof is shown and designated generally as computing device 100. Computing device 100 is but one example of a suitable computing environment and is not intended to suggest any limitation as to the scope of use or functionality of embodiments hereof. Neither should the computing device 100 be interpreted as having any dependency or requirement relating to any one or combination of components illustrated.

Embodiments hereof may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. Embodiments hereof may be practiced in a variety of system configurations, including hand-held devices, consumer electronics, general-purpose computers, more specialty computing devices, etc. Embodiments hereof may also be practiced in distributed computing environments where tasks are performed by remote-processing devices that are linked through a communications network. In a distributed computing environment, program modules may be located in both local and remote computer storage media including memory storage devices.

With reference to FIG. 1, computing device 100 includes a bus 110 that directly or indirectly couples the following devices: memory 112, one or more processors 114, one or more presentation components 116, input/output ("I/O") ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments hereof. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
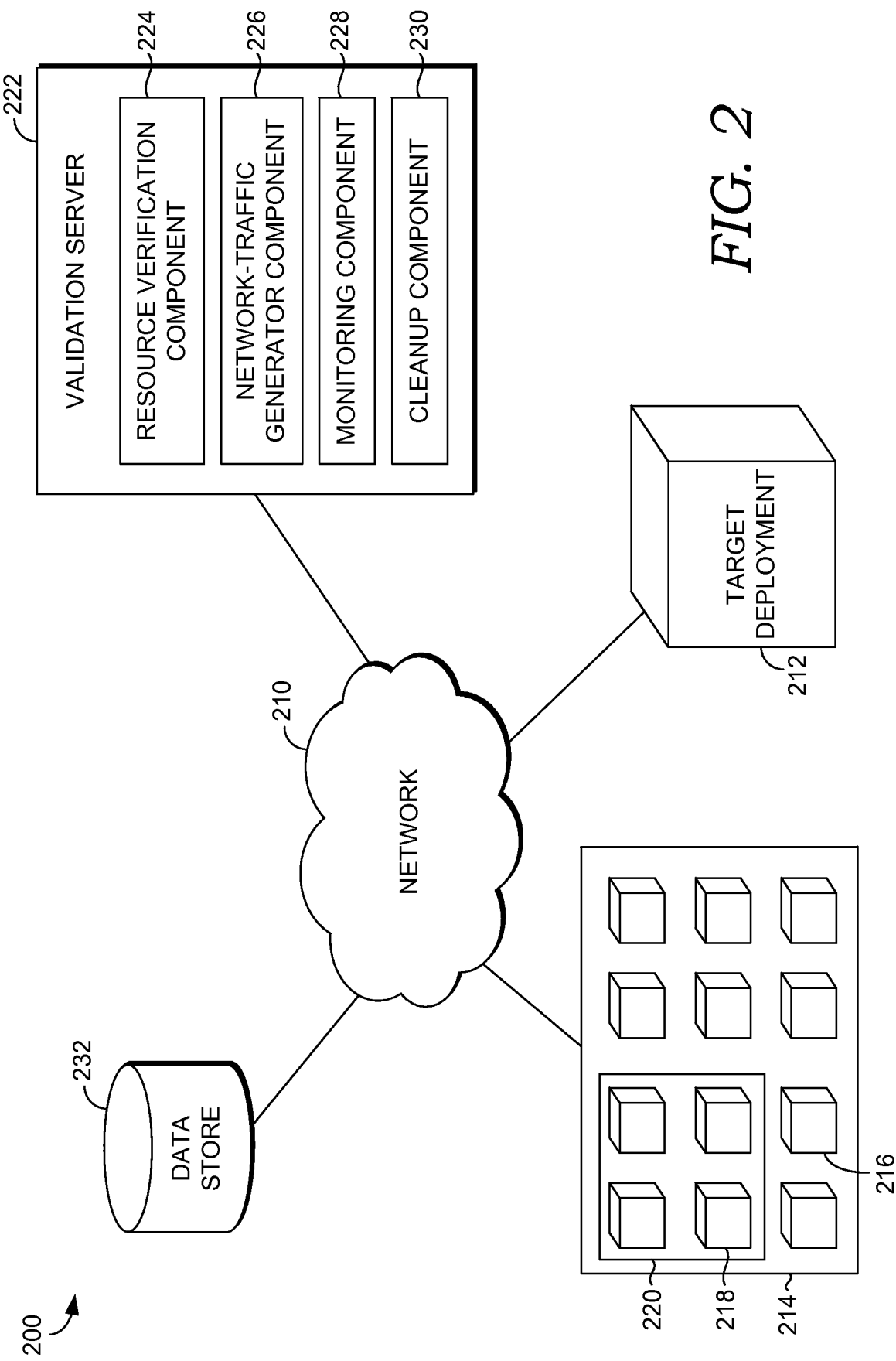
FIG. 2 is a block diagram of an exemplary network environment in which embodiments hereof may be employed.

Turning now to FIG. 2, a block diagram depicting an exemplary distributed system 200 suitable for use in implementing embodiments hereof is described. Generally, the system 200 illustrates an environment that may be used for, among other things, generating a nonintrusive, dynamically-scalable network load in order to validate network connectivity for new and/or existing cloud services. The system 200 may also be used to simulate a DoS attack and assess the system response. Among other components not shown, the system 200 may generally include a target deployment 212, a plurality of computing devices 214, a validation server 222 that may be used to validate network connectivity and/or simulate a DoS attack while monitoring network performance, and a data store 232, all in communication with one another via a network 210. The network 210 may include, without limitation, one or more local area networks (LANs) and/or wide area networks (WANs). The network 210 may further include a cloud computing network, such as a public cloud, a private cloud, and/or a dedicated cloud. Such networking environments are commonplace in offices, enterprise-wide computer networks, intranets and the Internet.

In some embodiments, one or more of the illustrated components and/or modules may be implemented as stand-alone applications. In further embodiments, one or more of the illustrated components and/or modules may be implemented via a computing device, as an Internet-based service, and/or as a module within the validation server 222. It will be understood by those of ordinary skill in the art that the components and modules illustrated in FIG. 2 are exemplary in nature and in number and should not be construed as limiting. Any number of components and/or modules may be employed to achieve the functionality described herein. For example, any number of computing devices, target deployments, validation servers, data stores, and networks may be employed in the computing system 200 within the scope of embodiments hereof. Each may comprise a single device/interface or multiple devices/interfaces cooperating in a distributed environment. For instance, multiple devices and/or modules arranged in a distributed environment may collectively provide the validation server functionality described herein. The phrase "application" or "service" as used herein may broadly refer to any software, or portions of software, that run on top of, or access storage locations within, a computing device and/or multiple computing devices, such as multiple computing devices in a data center.

It should be understood that this and other arrangements described herein are set forth only as examples. Other arrangements and elements (e.g., machines, interfaces, functions, orders, and/or groupings of functions) can be used in addition to, or instead of, those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions, including the functions described below with respect to the distributed computing system 200, may be carried out by a processor executing instructions stored in memory.

Turning now to the various components that may be included in the system 200, the target deployment 212 may include any deployment of network infrastructure, such as the deployment of a compute cluster and/or a storage cluster. A compute cluster may include a collection of linked computing devices that provide computational capacity and may share a computational workload. A storage cluster (which may also be referred to as a "storage stamp") may include any collection of physical drives and/or other computer-readable memory, which may be coupled to one or more processors. For example, a storage cluster may be comprised of a group of nodes, a cluster or set of racks providing storage, or one or more data centers. A deployment of compute and/or storage capacity may be located at a particular data center, along with other devices and services. It should be noted that the various features discussed below with respect to the target deployment 212 may apply to any new and/or modified deployments, such as deployments of compute and/or storage capacity.

The target deployment 212 may be a new and/or existing deployment. For example, the target deployment 212 may be a storage cluster that is a target for a deployment of new capacity, network reconfiguration and/or retrofitting, device replacement, software upgrading, DoS simulation testing, as well as any combination of these and other activities. Prior to going live with a new deployment or a modification to an existing deployment (e.g., a new storage cluster or a modification to an existing storage cluster), testing may be performed to validate the network connectivity for the new and/or existing deployment. For example, the testing may confirm that a target storage cluster is associated with connectivity that provides sufficient bandwidth and/or throughput, and that also maintains latency and/or failures within acceptable levels. The testing may further confirm that providing this connectivity to a target storage cluster does not interrupt live operations occurring over the network 210. These aspects of the testing are discussed in greater detail below.

In one example, the target deployment 212 may be an existing storage cluster in a data center. In this instance, the target deployment 212 might require an increase in capacity, which may require additional hardware and/or software at the cluster. In order to ensure that the additional components are functioning properly and that the network connectivity provided to the storage cluster satisfies the increased need for capacity, network load testing may be performed. In another instance, an existing storage cluster may need modifications to its hardware and/or software components, such as a hardware replacement and/or software upgrade. Upon completing such modification, network load testing may be performed to confirm that the hardware and/or software components are functioning properly. Additionally or alternatively, the target deployment 212 may be a new storage cluster. For example, a new storage cluster may be implemented at a data center in order to provide new capacity. Network load testing may be performed in order to validate network connectivity for this new cluster and ensure all components are functioning properly. Furthermore, the new and/or existing target storage cluster may be subjected to a simulated DoS attack and a performance of the target storage cluster may be assessed to determine whether the target storage cluster is configured to gracefully manage a genuine DoS attack. As mentioned, the above discussion also applies to other deployments within a network, such as a deployment of a compute cluster.

In embodiments, the target deployment 212 is a dedicated storage cluster. For example, a single entity, such as a single customer, might have exclusive access, such as read and write access, to the target storage cluster. In this instance, all data traffic for that particular customer may go to one or more dedicated storage clusters. A certain level of network connectivity may be needed to support this traffic. Additionally, an SLA with a customer that is the end user of the storage cluster may contain terms establishing a minimum level of service to be provided at the storage cluster. For example, the SLA may provide for a certain number of gigabytes per second, I/Os per second, read/writes per second, or any other measure of service performance Adequate network connectivity may be needed to meet the specified level of service. Thus, network load testing may be performed to validate network connectivity for the dedicated storage cluster. If the target deployment 212 is a shared and/or public storage cluster, a different SLA may apply. Testing may be performed to validate network connectivity for these arrangements, as well.

The source of the network load for the load generation described above may include any number of computing devices, such as the plurality of computing devices 214. It will be understood that while the plurality of computing devices 214 are illustrated in a cluster, in practice, these computing devices may be geographically distributed over a large region. For example, the computing device 216 may be located in Chicago, Ill., while the computing device 218 may be located in Quincy, Wash. It may be necessary to employ computing devices in various geographic locations in order to generate a sufficient load for validating network connectivity at the target deployment 212. This geographic distribution will be discussed with respect to FIG. 4. It will further be understood that while the plurality of computing devices 214 are depicted as individual items and described as "a computing device" (e.g., the computing device 216 and the computing device 218), in practice, each depicted item may actually represent multiple computing devices. For example, the computing device 216 may represent multiple computing devices. Additionally, the computing devices might not include separate physical devices, but might instead include an array of virtual machines. A combination of physical and virtual machines may be included in the plurality of computing devices 214.

The plurality of computing devices 214 may be associated with resources that include a network bandwidth capacity and/or a compute capacity. The computing devices and the associated resources may be used to generate a network load in order to test the network connectivity provided to the target deployment 212, and/or to test the response of the target deployment 212 to a simulated DoS attack. Network load (also referred to as network-traffic load) may comprise network traffic based on generating network sessions like I/O requests, Web, email, etc. over multiple connections in order to utilize predetermined amounts of compute and/or bandwidth. Network load generated at the plurality of computing devices may in turn cause additional load generated from the target deployment 212 during testing. For example, a request generated at a computing device to generate network load can trigger an acknowledgement from a target deployment 212, such as an acknowledgment from a target storage cluster, in response to the request. As mentioned, in order to generate a sufficient network load, multiple computing devices may be employed. For example, the group of source computing devices 220, which is a subset of the plurality of computing devices 214, may be employed. Additional details regarding this feature are provided below.

The validation server 222 may include various components for implementing nonintrusive network-traffic load generation to test various end-to-end scenarios. For example, the validation server 222 may include a resource verification component 224, a network-traffic generator component 226, a monitoring component 228, and a cleanup component 230. It will be understood that the components 224, 226, 228, and 230 illustrated in FIG. 2 are exemplary in nature and in number and should not be construed as limiting. The validation server 222 may implement a service that facilitates performing the functions of the validation server 222. By way of example, the service application may provide a processing interface to send and receive service requests to internal and external components and modules. Any number of components and validation services may be employed to achieve the desired functionality within the scope of embodiments hereof.

At a high level, the validation server 222 may implement an automated service that causes a number of source computing devices, such as one or more of the plurality of computing devices 214, to generate a network load that targets the target deployment 212, or any other deployment within the network infrastructure. The validation server 222 may dynamically scale the load directed to the target deployment 212 until sufficient network connectivity at the target deployment 212 has been confirmed. Additionally or alternatively, a network load may be generated and scaled to simulate a DoS attack of a desired severity. During these various scenarios, the validation server 222 may monitor the performance of the distributed computing system 200 in order to generate performance reference points for the system 200 at various levels of network load, as well as to minimize disruption and costs at various components within the system 200.

This testing of network connectivity and/or simulation of DoS attacks may occur concurrently with live operations taking place over the network 210. The phrases "live operations" and/or "live traffic," as used herein, may refer to ongoing operations and/or traffic that support live activities, such as customer activities, on the network. In embodiments, the phrases "live operations" and/or "live traffic" may refer to traffic that is unrelated to the network-traffic load generated for testing purposes. The "live operations" and/or "live traffic" may occur concurrently with the network-traffic load that is generated for testing purposes. Testing traffic and live traffic may both be simultaneously directed to a similar location and may share network pipelines. These two types of traffic may thus occur in parallel. For example, at least one source computing device may be associated with live operations at a time that the source computing device generates a network load for testing purposes. Additionally, the network infrastructure between the source computing devices and the target deployment 212 may be supporting live operations when the network load is generated for testing. Live traffic may therefore be said to flow around the target deployment 212. In this way, the testing may validate the performance of the target deployment 212, as well as the network and other network components, in an environment that includes live traffic, thereby ensuring satisfactory performance when the target deployment 212 goes live. At the same time, the validation server 222 may ensure that the testing does not interfere with the live operations. In embodiments, testing is performed after the target deployment 212 has been integrated into a production environment (e.g., connected to production systems), but before it "goes live" (e.g., before it is released to a customer for use). The testing for the target deployment 212 may thus be described as "pre-live" testing.

The functionality provided by exemplary components included in the validation server 222 will now be described in greater detail.

The resource verification component 224 may verify the settings and/or parameters for testing. For example, the resource verification component 224 may verify the network connectivity required at the target deployment 212 (e.g., if the target deployment 212 is a storage cluster, the required network connectivity may be defined in an SLA). The total bandwidth into a target location, such as a data center, associated with the target deployment 212 may also be determined. The resource verification component 224 may utilize the network monitoring infrastructure to determine other settings and/or parameters associated with the system 200. For example, a load that a network router can handle may be determined.

Additionally, the resource verification component 224 may determine network links associated with a location of the target deployment. For example, network links associated with a target location at which the target deployment 212 is located may be identified. As illustrated in the system 200, the plurality of computing devices 214 may be linked to the target deployment 212 via the network 210, and the resource verification component 224 may identify them as such.

The resource verification component 224 may then detect characteristics, such as resources, associated with these links. For example, a bandwidth capacity associated with a connection between the target location and each of the plurality of computing devices 214 may be determined. A compute capacity associated with the plurality of computing devices 214 that are linked to the target location may also be determined.

In this way, the resource verification component 224 may determine a total amount of resources associated with the computing devices that may be linked to the target deployment 212. The resource verification component 224 may further determine a portion of the total amount of resources that is currently being used within the system 200 for live operations. The remaining portion of resources may be deemed available resources, such as resources that are available for testing network connectivity at the target deployment 212.

For example, the resource verification component 224 may determine a particular bandwidth associated with a connection between the computing device 216 and a target location for the target deployment 212, such as a data center at which the target deployment 212 is located. The resource verification component may further determine that a portion of that bandwidth is being used to conduct live operations between the computing device 216 and the target location. For example, 40% of the bandwidth might be used for ongoing live operations, such as video streaming. The resource verification component 224 may then determine that 60% of the total bandwidth between the computing device 216 and the target location is an available resource. The resource verification component 224 may make a similar determination for other computing devices having a connection, such as a network connection, to the location of the target deployment 212.

Based on the determination of available resources, the resource verification component 224 may select one or more computing devices to serve as source computing devices for generating a network load during testing. For example, a subset of the plurality of computing devices 214 may be selected. In the exemplary system 200, the source computing devices 220 are selected. This selection may be based on a finding that the source computing devices 220 are associated with sufficient available resources to run the testing. For example, suppose the target deployment 212 needs to support a particular level of service (e.g., as specified in an SLA), and that a particular network load must be generated to test that level of service. As an additional example, suppose a particular network load is needed to simulate a DoS attack. In either example, the source computing devices 220 may be selected based on a determination that their combined available resources are sufficient to generate that particular network load. For instance, the selection could be based on the amount of available resources satisfying a predetermined threshold (e.g., a predetermined threshold based on an amount of resources needed to provide a level of service specified in an SLA and/or an amount of resources needed to simulate a DoS attack). In one example, computing devices associated with the largest amount of available bandwidth to the location of the target deployment 212 are identified and considered for selection. In this way, selection may be based on an absolute amount of available resources associated with a computing device. For example, available resources may need to be sufficient to satisfy a service level of a particular number of gigabytes per second, I/Os per second, writes/reads per second, and/or any other measure of service at the target deployment 212.

The selection may also be based on a relative amount of available resources associated with the computing device. For example, a particular source computing device, such as the source computing device 218, may be selected based on a determination that the available portion of the total resources associated with that computing device satisfies a predetermined individual threshold. For example, if the predetermined threshold is set at 80%, then a computing device might only be selected to serve as a source computing device if the portion of bandwidth resources that are available at that device is greater than or equal to 80% (or in other words, ongoing live operations are consuming less than or equal to 20% of the total bandwidth resources associated with the device). The resource verification component 224 may determine whether a computing device satisfies the predetermined threshold before selecting it as a source computing device. Satisfying the predetermined threshold may be a precondition for selection, in embodiments. This predetermined threshold may be set anywhere between 0% and 100% (or any similar measure that indicates a relative portion). For example, a source computing device might be selected based on a determination that is not supporting any live operations. In this way, the source computing devices generating a network load for testing purposes (e.g., a network connectivity test or a simulated DoS test) may be separate from the computing devices supporting live operations.

The selection of source computing devices 220 may be based on other factors, as well. For example, the selection may be based on a determination that the required network load may be generated with a predefined portion of available resources associated with a computing device, such as available resources associated with all source computing devices and/or available resources associated with a particular source computing device. For example, suppose it is determined that 40% of the bandwidth resources associated with the source computing device 218 is being used to support live operations, and that the remaining 60% of the bandwidth resources is available. In this instance, it may be determined that only 50% of the available bandwidth resources (or 30% of the total bandwidth resources associated with the source computing device 218) will be used for testing purposes. The amount of available resources used for testing may be capped at a predetermined threshold (e.g., 50% in the preceding example) in order to ensure that the testing does not interfere with live operations. For example, utilizing only a portion of the available resources may prevent such interference, even if there is a spike in the amount of resources consumed to support live operations. Thus, a source computing device may be selected based on its ability to generate a particular network load using a portion of its available resources where the portion falls below the designated cap. This cap may be implemented at the level of each individual device, as explained above, as well as at the level of a source location associated with multiple source computing devices. For example, the portion of resources used for testing at a single source location may be capped at a predetermined threshold. The predefined threshold for an individual computing device and/or a source location may be set anywhere between 0% and 100% (or any similar measure that indicates a relative portion). In embodiments, the threshold may be an absolute measure of resources, such as a cap of a particular number of gigabytes per second, for example. In further examples, the threshold may correspond to a cost of resources (e.g., a cost of network bandwidth and/or a cost of compute resources). Such costs may be linear or non-linear. For example, the costs may be determined by demand-based pricing.

The resource verification component 224 may also determine whether sufficient compute resources exist at the computing devices being considered to serve as sources. For example, if a computing device satisfies the criteria relating to available bandwidth, the computing device may nonetheless be rejected as a source computing device if it lacks adequate compute resources for generating the necessary network load. Thus, the resource verification component 224 may consider bandwidth capacity, compute capacity, as well as other resources associated with computing devices when selecting the source computing devices.

The selection of the source computing devices 220 may be based on any number of other factors. For example, location restraints may be considered. If it is determined that load testing should not cross geo-regional boundaries, then that factor may influence the selection of source computing devices 220 (e.g., only computing devices within the same geo-region as the target deployment 212 might be selected as source computing devices in this instance).

In response to selecting the source computing devices 220, the network-traffic generator component 226 may deploy a network-traffic generator service to the source computing devices 220. For example, each of the source computing devices 220 may be provided with the network-traffic generator service. The network-traffic generator service may then be executed in order to generate a network load that is directed from each of the source computing devices 220 (e.g., from source computing device 218) to the target deployment 212. For example, a batch service may be called upon to deploy compute resources. Load generation may further include initiating data writes at the target deployment 212, such as data writes at a target storage cluster, or otherwise generating traffic in the direction of the target deployment. A dashboard may show active jobs included in the testing, and may further display information regarding the source computing device selected to generate a load associated with a particular job.

In embodiments, the network-traffic generator component 226 configures a relatively small initial network load to be generated. The small scale of the initial load may minimize the impact that the testing has on the source computing devices 220, target deployment 212, network 210, as well as any other component included in the system 200. For example, during normal operations, certain source computing devices and/or target deployment components might be in a sleep mode. When the initial network load causes an increase in traffic, those computing devices and/or target storage cluster components might wake up. During this initial time frame, some failures may occur at those devices. Beginning with a minimal initial load may minimize such failures.

After the initial network load has been generated, the network-traffic generator component 226 may wait for the load to stabilize. As mentioned above, it may take time for all source computing devices, target storage cluster components, and/or other components within the network infrastructure, to become active. One indication of load stability may be that the source computing devices 220 are providing consistent data over a given period of time. Another indication could be consistency in the number of failures that are observed. For example, as mentioned above, if one or more source computing devices are initially in a sleep mode, some period of time may pass before those devices are active and providing consistent data, as well as before the number of observed failures falls back below a predefined limit, such as a limit established in an SLA.

Throughout the entire testing process, the monitoring component 228 may monitor the performance of the system 200. For example, performance may be monitored in order to determine whether or not the load has stabilized. Additionally, the monitoring component 228 may evaluate various performance metrics for the system 200 to determine whether the system 200 is performing satisfactorily in response to the generated network load. A satisfactory performance may correspond to a performance that meets standards specified in an SLA and/or a performance that does not interfere with ongoing live operations. SLA performance metrics can further include availability, response time, channel capacity, latency, completion time, service time, bandwidth, throughput, relative efficiency, scalability, performance per watt, compression ratio, instruction path length, and speed up. Other variations and combinations of performance metrics are contemplated as falling within the scope of embodiments hereof. Performance metrics may also account for system response to a simulated DoS attack. For example, performance metrics may indicate whether or not a network infrastructure component gracefully manages a DoS attack.

The metrics considered and interpreted by the monitoring component 228 may include metrics for the network infrastructure, metrics for the network-traffic generator service (including metrics for the source computing devices 220), and metrics for the target deployment 212. For example, health data for network devices, such as access routers, DC routers, and other network components, may be communicated to or retrieved by the monitoring component 228 to be monitored and interpreted. Additionally, the monitoring component 228 may receive an alert from one or more of these components if a problem at the component is detected. For example, if the network monitoring infrastructure detects a problem at the network, such as network failures, then the network monitoring infrastructure may generate an alert that is received by the monitoring component 228.

If it is determined that the performance metrics for one or more of these components fails a predetermined performance threshold and/or if the monitoring component 228 receives an alert regarding one or more of these components, then a course of action may be chosen based on the particular failed metrics and/or alarm. For example, if it is determined that there are problems at the network infrastructure (e.g., full capacity, higher costs, insufficient throughput, and/or other network constraints), the load may be redistributed across the existing source computing devices and/or across additional source computing devices (this aspect will be discussed in more detail below). If this is unsuccessful, testing may be terminated.

In another example, if unexpected errors and/or failures occur at the target deployment 212, the testing may be terminated, as will be described with respect to the cleanup component 230. The problems giving rise to the errors and/or failures may be addressed before testing is reinitiated. In particular, the monitoring component 228 may ensure that the target deployment 212 is able to perform certain functions. For example, if the target deployment 212 is a storage cluster, the monitoring component may ensure that the storage cluster is able to write data, load balance, and perform any other function that may be needed at the storage cluster. A storage diagnostics service (not shown) may provide relevant information to the monitoring component 228.

If errors and/or failures are observed at the source computing devices 220 (e.g., latency and/or throughput metrics are failing standards specified in an SLA), then one of several actions may be taken. These errors and/or failures may cause an alarm to be raised. Based on the monitoring, it may be determined whether an additional attempt should be made to satisfy the performance metrics. For example, if the load has not actually stabilized (e.g., a determination of stability was made incorrectly), then allowing additional time to pass may result in improved performance metrics and/or a resolution of conditions giving rise to alerts. If the monitoring component 228 determines that a subsequent attempt should not be made and/or if repeated attempts are made and performance does not improve, then the network load may be reduced. Additionally or alternatively, testing may be terminated altogether. Such termination may avoid failures in live operations. Termination of testing will be discussed in more detail below with respect to the cleanup component 230.

On the other hand, if it is determined that the performance of the system is satisfactory, such as when there is an absence of alerts and/or the monitored performance metrics satisfy the predetermined performance threshold, then a determination as to whether or not more load is needed may be made. For example, if only the minimal initial load has been generated, then an increased load that is greater than the minimal initial load is likely needed. In this case, the network-traffic generator component 226 may initiate the generation of additional load. This may be referred to as "scaling up" the load and/or "scaling up" the network-traffic generator service in order to increase the network load.

Figure 3:
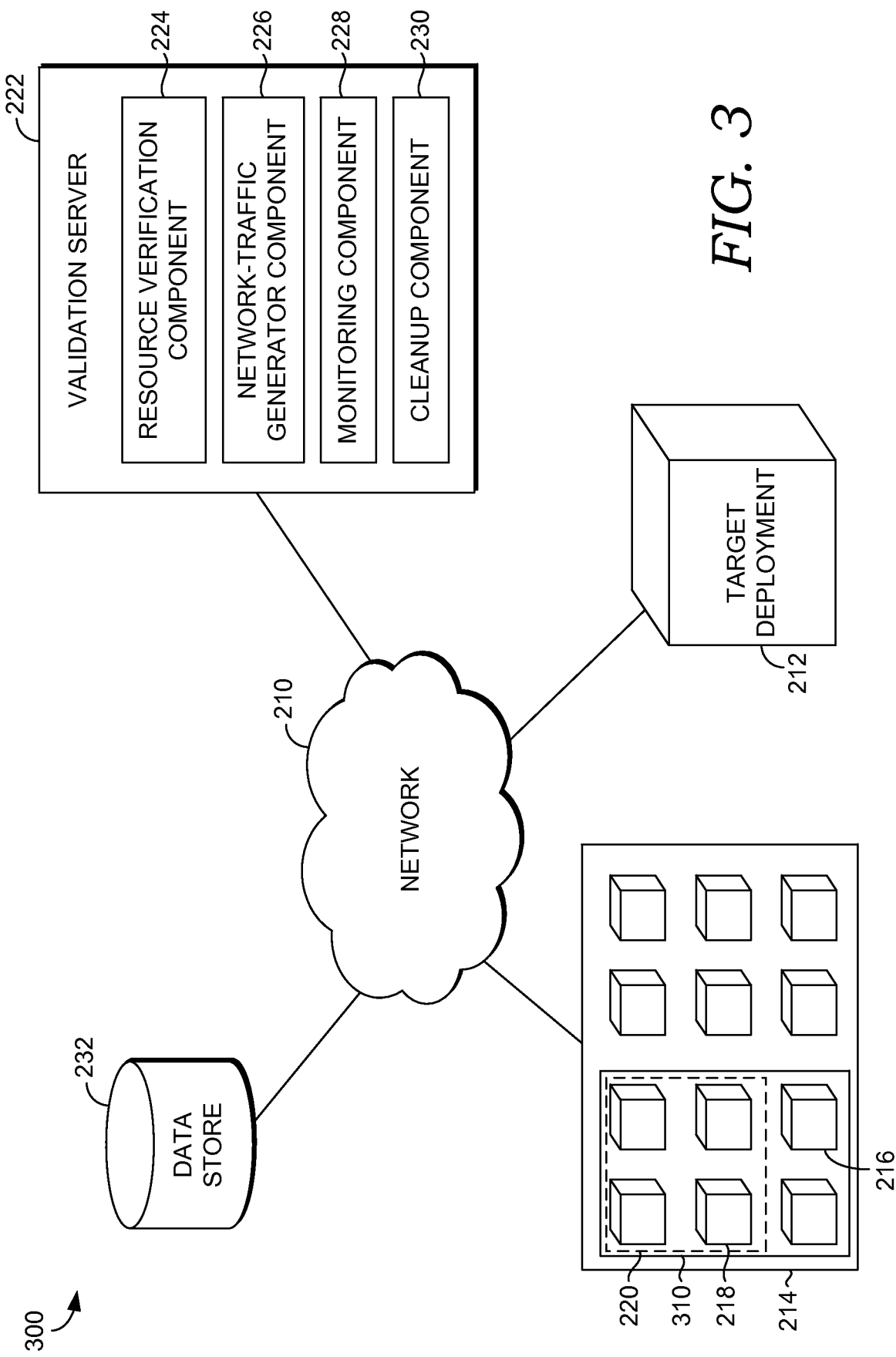
FIG. 3 is a block diagram of an exemplary network environment in which embodiments hereof may be employed.

Scaling up the load may take a variety of forms. In some instances, this may involve increasing the load that is generated from the existing source computing devices. For example, the load generated from the source computing devices 220 may be increased. Additionally or alternatively, this may include employing additional devices as source computing devices. Additional devices may be employed if it is determined that an increased load cannot be generated from the existing source computing devices without compromising the performance of the system 200. In this instance, the load generated by the existing source computing devices 220 may remain unchanged, but an increased load may be generated by the addition of more source computing devices. This is illustrated in exemplary distributed system 300 of FIG. 3, where the source computing devices 310 are greater in number than the previously-selected source computing devices 220. (It should be noted that like reference numerals throughout the set of figures are used to indicate similarly configured components in the various views; however, some aspects of these components sharing like reference numerals may vary according to embodiments hereof.) In this case, the network-traffic generator service may be deployed to the additional source computing devices in order to generate additional network load from the additional source computing devices. It should be noted that the additional source computing devices may be physical machines and/or virtual machines. The additional virtual machines may be existing virtual machines and/or newly-provisioned virtual machines. A combination of these activities (e.g., increasing the load generated by existing devices and/or adding new devices, such as adding existing physical devices, adding existing virtual machines, and/or provisioning new virtual machines) may be used to increase the network load that is generated for testing purposes.

After the load is increased, the network-traffic generator component 226 may again wait for a period of time to pass in order to allow the increased load to stabilize. The monitoring component 228 may then monitor and/or evaluate various performance metrics in order to determine whether the system 200 is meeting the predetermined performance threshold, and the process described above may be repeated. In particular, this process may be repeated with increasing network loads until the network load that is generated is large enough to validate the network connectivity needed at the target deployment 212, and/or to simulate a DoS attack of the desired scale. For example, the process may be repeated until it has been determined that the network connectivity provided to a target storage cluster is sufficient to satisfy a predefined level of service, such as a standard specified in an SLA. The network load may be increased incrementally. These increments may be based on the performance of the distributed computing system in response to the generated network load.

After the desired level of network connectivity has been validated and/or the DoS attack has been simulated, the performance of the system 200 has been found to satisfy a performance threshold, and the testing has been successfully completed, testing may be terminated. Termination will be discussed in greater detail below with respect to the cleanup component 230.

As the load is scaled according to one or more of the processes described above, the monitoring component 228 may be continuously monitoring the performance of the system 200. Based on the monitored performance, the load generated from a particular source computing device may be adjusted. For example, it may be determined that the particular source computing device is performing poorly in response to the increased load. Additionally or alternatively, it may be determined that the network load generation is consuming too many resources (e.g., an amount of resources that exceeds the resource thresholds previously discussed). Based on such determinations, the load generated from that source computing device may be reduced and/or eliminated, and the required load may instead be generated at another existing and/or a new source computing device. Thus, the source computing devices that are utilized for testing purposes may be dynamically selected throughout the course of testing. Additionally, while the overall goal may be to continuously increase the total network load generated for testing, the load may decrease between some iterations of testing. For example, when failures are observed and/or the amount of available resources at the source computing devices is reduced, the total network load may be decreased before it is once again increased. In this way, the load generated may be dynamically scaled based on real-time monitoring of the performance of the system 200, including dynamic scaling that may be based on a performance of a particular system component.

For example, suppose a particular computing device is determined to have 90% of its total bandwidth resources available when testing begins. Based on this level of available resources, the computing device may be selected as a source computing device. But then suppose that after testing begins, the amount of live traffic supported by that particular source computing device increases, such that only 50% of its bandwidth resources is available for testing. Consequently, continuing to utilize the resources associated with that computing device for testing may interfere with the live operations being supported by that computing device. As such, the network load generated by that source computing device may be reduced, or even eliminated, in order to avoid interference with live operations. Similarly, the network load at a particular source computing device may be reduced and/or eliminated in response to errors and/or failures associated with that device. This reduction and/or elimination of generated load may be compensated for by increasing the load generated by another source computing device, as well as by adding a new source computing device. These examples illustrate aspects of the dynamicity associated with the network load testing provided by embodiments hereof.

As mentioned above, termination may be triggered by performance metrics that fail a predetermined performance threshold, as well as by successful validation of a desired level of network connectivity. In either case, such termination may include terminating the network-traffic generator service and triggering action by the cleanup component 230. The cleanup component 230 may be configured to clean up the environment, such as by cleaning up the source computing devices 220 in FIG. 2 (and the source computing devices 310 in FIG. 3) and the target deployment 212. This cleanup may include tearing down a virtual machine setup and generally undoing the actions that were taken to launch the testing. Batch jobs may be deleted, and test artifacts at the target deployment 212 may also be deleted. The cleanup component 230 may further gather all logs associated with the testing, create results reports, and email any documentation associated with the testing, as necessary. The cleanup component 230 may take other actions associated with concluding the testing process.

As previously mentioned, throughout the testing process described above, the monitoring component 228 may monitor the performance of the system 200. In addition to monitoring the system in order to assess system performance and dynamically scale the generated network load, the monitoring component 228 may monitor the system 200 in order to capture reference points at various network loads that are generated. A reference point may correspond to a snapshot of the system 200 at a particular network load. For example, a reference point for a network load of 20 gigabytes per second may include performance metrics for various components within the system 200 when a network load of 20 gigabytes per second is generated. If the network load is increased to 25 gigabytes per second, a reference point corresponding to the load of 25 gigabytes per second may be generated in order to provide a snapshot of the performance of the system 200 at a load of 25 gigabytes per second. In this way, a reference point may correspond to a particular network load, and a reference point may be generated and/or captured at multiple different network loads. In embodiments, a reference point provides an overview of the performance of the system 200. In further embodiments, a reference point is generated for each component in the system 200 at a particular network load, such that the performance of each component is captured. The performance metrics captured by a reference point may include availability, response time, channel capacity, latency, completion time, service time, bandwidth, throughput, relative efficiency, scalability, performance per watt, compression ratio, instruction path length, and speed up. Thus, the reference points may provide an overall picture of events occurring within the system 200 at a particular load.

These reference points may be beneficial for a number of reasons. For example, at a particular network load, the performance of the system 200 may meet a particular performance threshold, such as a threshold based on an SLA, but in order to accomplish this, various components within the system may be pushed to undesirable limits. For example, if 90% of available resources are used to meet a performance threshold for network connectivity, that may be undesirable and corrective action may be taken. Additionally or alternatively, in this instance, it may be determined that current SLAs should be reevaluated and/or that a certain SLA cannot be offered to a new customer, because failures may be likely to occur. The reference points may also be useful, because they may indicate the performance of the system 200 at a variety of network loads. This may be used for planning purposes, as well as for predicting future system behavior.

Turning now to the data store 232, as mentioned, the plurality of computing devices 214, the target deployment 212, and the validation server 222 may all be in communication with the data store 232 via the network 210. The data store 232 may be configured to store information for use by, for example, the validation server 222. The information stored in association with the data store 232 may be configured to be searchable for information stored in association therewith. The information stored in association with the data store 232 may comprise general information used by the validation server 222, such as information regarding the network infrastructure (e.g., settings and/or parameters associated with the system 200, such as those verified by the resource verification component 224), information from an SLA associated with the target deployment 212, reference points that are generated at a variety of network loads, the performance thresholds to which the monitoring component 228 may compare the performance metrics for the system 200, testing results and/or logs, reports (e.g., reports generated by the cleanup component 230), as well as any other information relevant to the system 200, the validation of network connectivity at the target deployment 212, and/or the simulation of a DoS attack. The content and volume of such information in the data store 232 are not intended to limit the scope of embodiments hereof in any way. Further, though illustrated as a single, independent component, the data store 232 may, in fact, be a plurality of storage devices, for instance, a database cluster.

Figure 4:
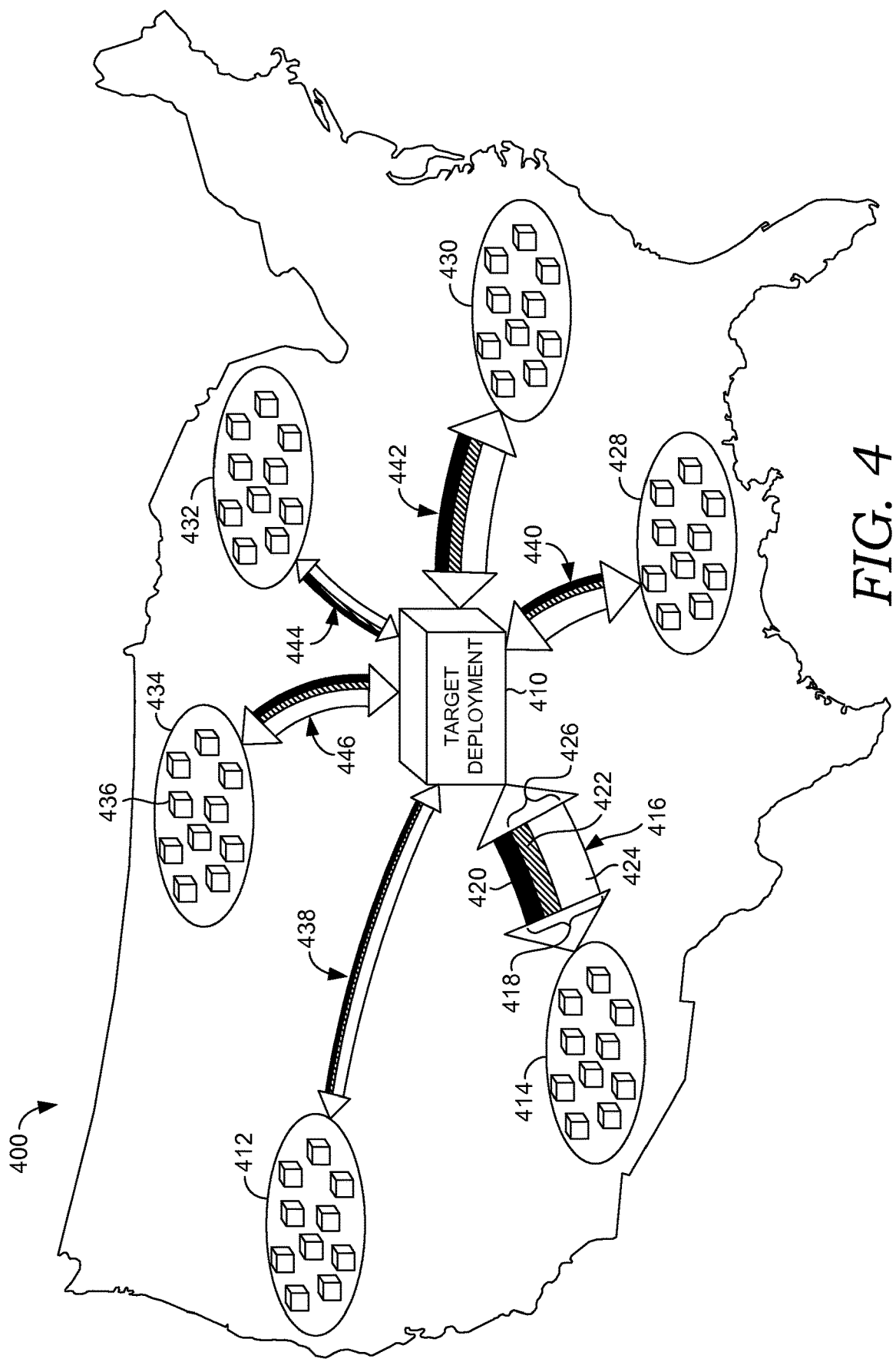
FIG. 4 is a block diagram of an exemplary geographic region including a plurality of source locations for generating a network load, in accordance with embodiments hereof.

Turning now to FIG. 4, an illustrative geographic region 400 including a collection of geographical locations is shown. The determination of available resources in a distributed computing system, such as the system 200 of FIG. 2, will be discussed with respect to FIG. 4. As shown in the geographic region 400, the target deployment 410 is associated with one geographical location. The target deployment 410 may be a deployment of any network infrastructure, such as a deployment of compute and/or storage capacity, as described with respect to the target deployment 212 of FIG. 2. Multiple computing devices, which may represent potential source computing devices, may be associated with a number of other locations, such as source locations 412, 414, 428, 430, 432, and 434. For example, the computing device 436 is associated with the source location 434. In embodiments, a source location represents a data center. The geographic region 400 is exemplary only, and it will be understood that other configurations including other source locations and/or other arrangements of computing devices are included within the scope hereof.

An arrow between each source location and the target deployment 410 represents resources associated with a link between the two. For example, the arrows may represent a bandwidth capacity associated with a link between a source location and the target deployment 410. Consider, for example, the arrow between the source location 414 and the target deployment 410. This arrow may represent a bandwidth capacity 416. The width 418 of the arrow may indicate a total amount of bandwidth capacity associated with the link between the source location 414 and the target deployment 410. As shown by the arrows having varying widths, the bandwidth capacity associated with links between the various source locations and the target deployment 410 may vary. For example, the width of the arrow between the source location 414 and the target deployment 410, as compared to the width of the arrow between the source location 412 and the target deployment 410, may indicate that the bandwidth capacity 416 associated with the source location 414 is greater than the bandwidth capacity 438 associated with the source location 412. The bandwidth capacities 440, 442, 444, and 446 associated with source locations 428, 430, 432, and 434, respectively, may also be compared in this manner. It will be understood that this configuration is exemplary only, and that it is simply intended to show the way in which varying resource capacities may be associated with different source locations.

The shading of the arrows associated with the source locations may indicate an allocation of the total resources associated with the locations. For example, the total width 418 of the arrow between the source location 414 and the target deployment 410 may represent a total amount of bandwidth capacity associated with that link. The solid area may represent bandwidth used to support live operations 420. Thus, the remaining width 426 (e.g., the difference between the total width 418 and the width of the solid area corresponding to live operations 420) may represent a relative amount of available resources, such as available bandwidth. A portion of these available resources may be used for network connectivity validation at the target deployment 410, as was described above. The hatched area may represent a portion of resources, such as bandwidth capacity, that is used as network connectivity and/or DoS simulation testing resources 422. The remaining white area may then represent available resources 424 after accounting for bandwidth consumed by both live operations 420 and testing 422.

Any number of computing devices at any number of source locations may be used to perform the network connectivity validation. Generating a sufficient network load may include employing computing devices associated with a number of different geographical locations, such as one or more of the source locations included in the geographic region 400. The network load may be dynamically sourced from the source locations based on network links and available resources, thereby utilizing spare resource capacity for validation. This may minimize overall costs in a distributed computing system.

Figure 5:
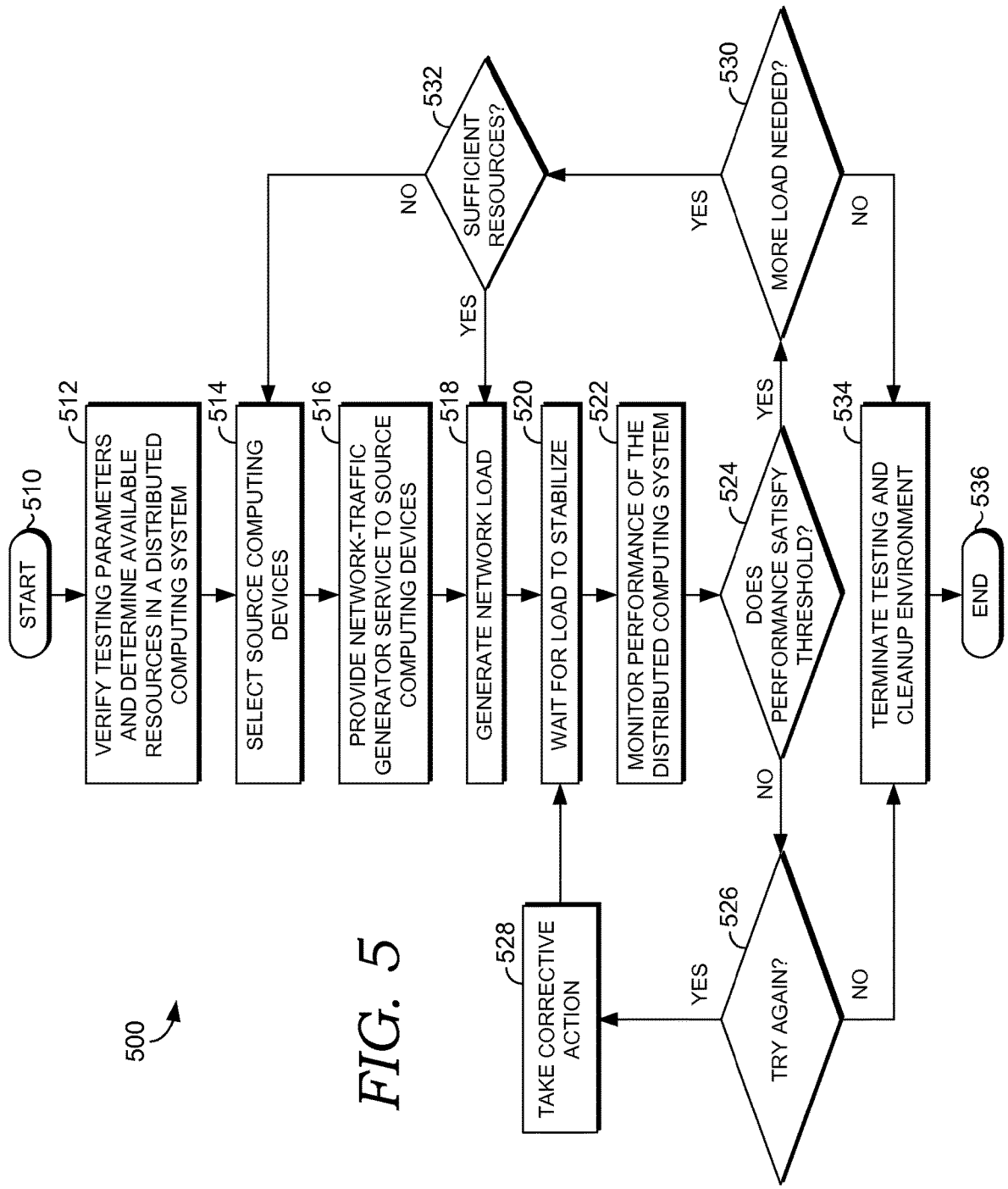
FIG. 5 is a flow diagram showing an exemplary method for nonintrusive network load generation in a distributed computing system, in accordance with embodiments hereof.

Turning to FIG. 5, an exemplary flow diagram 500 illustrates various steps and decision points included in an exemplary process for generating network-traffic load in a distributed computing system. The process may begin at block 510. At block 512, testing parameters may be verified and available resources within the distributed computing system may be determined. For example, these steps may be performed as described with respect to the resource verification component 224 of FIG. 2. Based on this determination, source computing devices may be selected at block 514. For example, the source computing devices may be selected based on an amount of available resources between a target deployment and the source computing devices. The source computing devices may be a subset of the total number of computing devices included in the distributed computing system.

At block 516, a network-traffic generator service may be provided to the source computing devices. The network-traffic generator service may be used to generate a network load at block 518, where the network load is directed from the source computing devices to the target deployment. At block 520, a period of time may be allowed to pass in order for the network load to stabilize. For example, time may be allowed to pass until the source computing devices are providing consistent data and errors are observed at a consistent rate. These steps may be performed as described with respect to the network-traffic generator component 226 of FIG. 2.

The distributed computing system may be monitored during the steps described above, and at block 522, in particular, its performance may be monitored to capture reference points and/or to determine how the distributed computing system is responding to the generated network load. This may be accomplished as described with respect to the monitoring component 228 of FIG. 2 and may include receiving alerts regarding the performance of network components. At block 524, it is determined whether the performance of the distributed computing system satisfies a predetermined performance threshold. This may be accomplished by comparing performance metrics for various components of the distributed computing system to a performance threshold for each respective component. Additionally or alternatively, this may be accomplished based on whether alerts indicating problems at one or more of the components are received.

If the performance is found not to satisfy the performance threshold at block 524, then at block 526, it may be determined whether another attempt to satisfy the performance threshold should be made. For example, if errors are observed within the network, then corrective action may be taken at block 528 (e.g., the network load might be redistributed), and the process may return to block 520, where time is allowed for the redistributed load to stabilize. Corrective action at block 528 might also include reducing the generated network load, de-provisioning and/or eliminating a source computing device such that it no longer generates network traffic for testing purposes, as well as any other corrective action that may be needed. In some instances, an affirmative corrective action might not be needed. For example, if errors are observed at the network-traffic generator service and/or at the source computing devices, the process may simply return to block 520, as it is possible that insufficient time was allowed for the load to stabilize initially. Additional time may allow the load to stabilize and the observed errors may be reduced and/or eliminated. If the load redistribution and/or repeated attempts are unsuccessful, then at block 526, it may be determined not to make an additional attempt to satisfy the performance threshold, and the network load may be scaled down, and/or testing may be terminated altogether at block 534. Similarly, a decision at block 526 may be made to terminate testing if unexpected errors are observed at the target storage cluster. In this instance, load redistribution and/or additional time may not be likely to resolve the observed problems.

If, at block 524, the performance is found to satisfy the performance threshold, then the process may proceed to block 530, where it may be determined whether more network load is needed. This inquiry may be answered in the affirmative if the current network load is insufficient to validate the network connectivity required at the target deployment and/or simulate a DoS attack of the desired severity. In this instance, it may further be determined at block 532 whether the current source computing devices are associated with sufficient resources to generate the increased network load. If so, the process may return to block 518 to generate an increased network load with the existing source computing devices. This may include redistributing the load among existing source computing devices. If it is determined at block 532 that the existing source computing devices are not associated with sufficient resources to generate the increased network load, then additional source computing devices may be selected and/or provisioned at block 514. The network-traffic generator service may be deployed to these additional devices. Thus, as explained with respect to FIG. 2, generating an increased network load may include any combination of increasing the load generated by the existing source computing devices, adding new source computing devices to generate an additional network load, redistributing the load among source computing devices, as well as any other means of dynamically sourcing and/or scaling the load.

At block 530, it might be determined that an increased network load is not needed. Such determination may be based on successful validation of network connectivity at the target deployment, as well as a distributed computing system performance that satisfies performance thresholds. In the event of successful testing, the testing may be terminated at block 534.

Terminating the testing and cleaning up the environment at block 534 may include the activities described with respect to the cleanup component 230 of FIG. 2. For example, batch jobs may be deleted, test artifacts at the target storage cluster may be cleaned up, reports may be generated, and documentation associated with the testing may be distributed, such as via email. The process may end at block 536.

Turning now to FIG. 6, a flow diagram that illustrates an exemplary method 600 for performing nonintrusive network load generation is illustrated. The method may be performed in a distributed computing system including a plurality of computing devices and a target deployment, such as a storage cluster and/or a compute cluster. At block 610, available resources in the distributed computing system may be determined. The available resources may include compute capacity and network bandwidth capacity associated with the plurality of computing devices in the distributed computing system. At block 612, a plurality of source computing devices may be selected to generate a network load directed from the plurality of source computing devices to the target deployment. The plurality of source computing devices may be subset of the plurality of computing devices included in the distributed computing system. The selection of the source computing devices may be based on an amount of available resources between the target deployment and the plurality of source computing devices. In one example, the selection includes determining the amount of available resources between the plurality of source computing devices and the target deployment satisfies a predetermined threshold. In embodiments, the target deployment is a target storage cluster and the predetermined threshold may be based on a level of service included in an SLA with an end user of the target storage cluster.

At block 614, a network-traffic generator service may be provided to the plurality of source computing devices in order to generate the network load directed from the plurality of source computing devices to the target deployment. In some instances, the individual network load directed from one of the plurality of source computing devices to the target deployment uses a predefined portion of an individual amount of available resources between the one of the plurality of source computing devices and the target deployment. In another example, it is determined that an available portion of individual resources between each of the plurality of source computing devices and the target deployment satisfies a predetermined individual threshold. At least one of the plurality of source computing devices may be associated with live operations at a time that the plurality of source computing devices generates the network load.

The performance of the distributed computing system may be monitored at block 616. In particular, the performance of the distributed computing system in response to the generated network load may be monitored.

The exemplary method 600 may further include, for example, dynamically scaling the network load directed from the plurality of source computing devices to the target deployment. In some instances, dynamically scaling the network load includes configuring an initial minimal load to be generated by the plurality of source computing devices, where the initial minimal load is directed from the plurality of source computing devices to the target deployment. A determination that the initial minimal load is stable may then be made. Performance metrics for the distributed computing system may be monitored, and based on those performance metrics satisfying a predetermined performance standard, the network-traffic generator service may be scaled up in order to generate an increased network load directed from the plurality of source computing devices to the target deployment. The increased network load may be greater than the initial minimal load. In some instances, the network-traffic generator service may be scaled up until the network load directed from the plurality of source computing devices to the target deployment satisfies a predetermined threshold associated with a predefined level of service. On the other hand, if the performance metrics fail the predetermined performance standard, the network-traffic generator service may be terminated based on this failure.

In another example, dynamically scaling the network load may include configuring an initial minimal load to be generated by the plurality of source computing devices, where the initial minimal load is directed from the plurality of source computing devices to the target deployment. The initial minimal load may be determined to be stable. Performance metrics for the distributed computing system may be monitored, and based on the performance metrics satisfying a predetermined performance standard, the network-traffic generator service may be provided to additional source computing devices in order to generate an additional network load directed from the additional source computing devices to the target deployment. In some instances, providing the network-traffic generator service to additional source computing devices may include provisioning a virtual machine and providing the network-traffic generator service to the provisioned virtual machine.

In a further example, dynamically scaling the network load may include determining that at least one of the plurality of source computing devices will generate a decreased network load directed to the target deployment. This determination may be based on the fact that resources associated with the at least one of the plurality of source computing devices are needed to support live operations.

A flow diagram that illustrates an exemplary method 700 for performing nonintrusive network load generation is illustrated in FIG. 7. At block 710, a portion of total resources in a distributed computing system that are available resources may be determined. The available resources may include compute capacity and network bandwidth capacity associated with computing devices in the distributed computing system. The determination of available resources may be based on a difference between the total resources associated with the computing devices and an amount of resources that is used for live operations.

At block 712, a plurality of source computing devices that are associated with an amount of available resources that satisfies a predetermined capacity threshold may be selected. A network-traffic generator service may be provided to the plurality of source computing devices at block 714. At block 716, the network-traffic generator service may be executed in order to generate a network load, such as a first network load, directed from the plurality of source computing devices to a target deployment. In particular, the target deployment may be a target storage cluster and/or a target compute cluster. The first network load may be generated and/or communicated concurrently with ongoing network activities associated with live operations.

The distributed computing system may be monitored at block 718. Monitoring may include assessing a performance of the distributed computing system in response to the network load. Monitoring the distributed computing system may include monitoring network infrastructure metrics, network-traffic generator service metrics, and target deployment metrics. In particular, monitoring the network infrastructure metrics may include receiving an alert that the first network load should be redistributed. Monitoring may also include generating reference points at various network loads, where the reference points correspond to performance metrics for the distributed computing system.

In embodiments, the method 700 may further include determining whether the performance of the distributed computing system satisfies a predetermined performance threshold. Based on determining that the performance satisfies the threshold, the network-traffic generator service may be scaled up in order to generate a second network load directed from the plurality of source computing devices to the target deployment. The second network load may be greater than the first network load. Conversely, based on determining that the performance fails the predetermined performance threshold, the network-traffic generator service may be terminated.

From the foregoing, it will be seen that embodiments hereof are well adapted to attain all the ends and objects hereinabove set forth together with other advantages obvious and inherent to the structure. It will be understood that certain features and sub-combinations are of utility and may be employed without reference to other features or sub-combinations. This is contemplated by and is within the scope of the claims.

What is claimed is:

1. A computer-implemented method for dynamically-scalable network load generation, via unused resources operating on live traffic, for validating network connectivity to target deployments, the method comprising:
determining an allocation of resources in a geographically distributed computing system, the geographically-distributed computing system comprising a plurality of computing devices and a target deployment, the allocation of resources comprising used resources operating on live traffic and unused resources that are available for generating testing traffic;
identifying a subset of the plurality of computing devices based on a network bandwidth capacity from the subset of the plurality of computing devices to the target deployment, wherein the subset of the plurality of computing devices is linked to the target deployment, the subset of the plurality of computing devices is associated with an amount of unused resources that is sufficient to satisfy a testing traffic requirement for the target deployment, wherein the testing traffic requirement for the amount of unused resources is independently configurable for network bandwidth capacity and compute capacity for determining that the amount of unused resources satisfies the testing traffic requirement;
determining a first network load for testing traffic to the target deployment;
allocating, from the subset of the plurality of computing devices, based on the network bandwidth capacity, a first set of source computing devices, wherein the first set of source computing devices is allocated to generate the first network load directed from the first set of source computing devices to the target deployment;
causing a network-traffic generator service at each of the first set of source computing devices to generate the first network load directed from the first set of source computing devices to the target deployment;
monitoring a performance of the geographically-distributed computing system, wherein the performance is in response to the first network load, and determining whether performance metrics for the geographically-distributed computing system are satisfied; and
communicating the performance metrics, wherein the performance metrics include an indication of whether the performance metrics for the geographically-distributed computing system are satisfied.

2. The method of claim 1, wherein the first network load satisfies a predetermined threshold to test a level of service specified in a service-level agreement (SLA).

3. The method of claim 2, wherein the target deployment is a target storage cluster and the predetermined threshold is based on the level of service included in the SLA associated with an end user of the target storage cluster.

4. The method of claim 2, wherein a network load directed from one of the first set of source computing devices to the target deployment uses a predefined portion of an amount of unused resources between the one of the first set of source computing devices and the target deployment.

5. The method of claim 1, further comprising determining that an unused portion of resources between each of the first set of source computing devices and the target deployment satisfies a predetermined threshold.

6. The method of claim 1, further comprising dynamically scaling the first network load directed from the first set of source computing devices to the target deployment.

7. The method of claim 6, wherein dynamically scaling the first network load comprises:
configuring an initial load that is directed from the first set of source computing devices to the target deployment;
monitoring performance metrics for the geographically-distributed computing system subsequent to generation of the initial load; and
based on the performance metrics satisfying a predetermined performance standard, scaling up the network-traffic generator service, wherein scaling up the network-traffic generator service causes the network-traffic generator service to generate an increased network load directed from the first set of source computing devices to the target deployment, wherein the increased network load is greater than the initial load.

8. The method of claim 7, further comprising, based on the performance metrics failing the predetermined performance standard, terminating the network-traffic generator service.

9. The method of claim 7, further comprising scaling up the network-traffic generator service until the first network load directed from the first set of source computing devices to the target deployment satisfies a predetermined threshold associated with a predefined level of service.

10. The method of claim 6, wherein dynamically scaling the first network load comprises:
configuring an initial load that is directed from the first set of source computing devices to the target deployment;
monitoring performance metrics for the geographically-distributed computing system subsequent to generation of the initial load; and
based on the performance metrics satisfying a predetermined performance standard, causing the network-traffic generator service at additional source computing devices to generate an additional network load directed from the additional source computing devices to the target deployment.

11. The method of claim 10, wherein providing the network-traffic generator service to the additional source computing devices comprises provisioning a virtual machine and providing the network-traffic generator service to the provisioned virtual machine.

12. The method of claim 6, further comprising scaling down a network load directed from at least one of the first set of source computing devices and the target deployment based on a demand for resources associated with the at least one of the first set of source computing devices for live operations.

13. The method of claim 1, wherein allocating the first set of computing devices from the subset of the plurality of computing devices is further based on compute capacity and origin points of the first set of computing device, wherein at least one of the first set of source computing devices is associated with live operations at a time that the first set of source computing devices generates the first network load.

14. One or more computer storage media having computer-executable instructions embodied thereon that, when executed, perform a method for dynamically-scalable network load generation, via unused resources operating on live traffic, for validating network connectivity to target deployments, the method comprising:

determining an allocation of resources in a geographically-distributed computing system, the geographically-distributed computing system comprising a plurality of computing devices and a target deployment, the allocation of resources comprising used resources operating on live traffic and unused resources that are available for generating testing traffic, the unused resources comprising network bandwidth capacity and compute capacity associated with the plurality of computing devices;

identifying a subset of the plurality of computing devices based on a network bandwidth capacity from the subset of the plurality of computing devices to the target deployment and a compute capacity of the subset of the plurality of computing devices are linked to the target deployment, the subset of the plurality of computing devices is associated with an amount of unused resources that satisfies a predetermined capacity threshold, wherein the predefined capacity threshold for the amount of unused resources is independently configurable for network bandwidth capacity and compute capacity for determining that the amount of unused resources satisfies the predefined capacity threshold;

allocating, from the subset of the plurality of computing devices based on the network bandwidth capacity and the compute capacity, a first set of source computing devices, wherein the first set of source computing devices is allocated to generate a first network load directed from the first set of source computing devices to the target deployment;

causing a network-traffic generator service at each of the first set of source computing devices to generate the first network load directed from the first set of source computing devices to the target deployment;

monitoring a performance of the geographically-distributed computing system in response to the first network load and determining whether performance metrics for the geographically-distributed computing system are satisfied; and communicating the performance metrics, wherein the performance metrics include an indication of whether the performance metrics are satisfied.

15. The one or more computer storage media of claim 14, wherein the method further comprises:

determining whether the performance satisfies a predetermined performance threshold;

based on determining that the performance satisfies the predetermined performance threshold, causing a second network load directed from the first set of source computing devices to the target deployment to be generated, wherein the second network load is greater than the first network load; and based on determining that the performance fails the predetermined performance threshold, terminating the network-traffic generator service.

16. The one or more computer storage media of claim 14, wherein monitoring the geographically-distributed computing system further comprises generating reference points at different network loads, wherein the reference points correspond to the performance metrics of the geographically-distributed computing system.

17. The one or more computer storage media of claim 14, wherein monitoring the geographically-distributed computing system comprises monitoring network infrastructure metrics, network-traffic generator service metrics, and target deployment metrics.

18. The one or more computer storage media of claim 17, wherein monitoring the network infrastructure metrics comprises receiving an alert that the first network load should be redistributed.

19. A computer system comprising:

one or more processors; and one or more computer storage media storing computer-executable instructions that, when executed by the one or more processors, are configured to implement a method comprising:

determining an allocation of resources in a geographically-distributed computing system, the geographically-distributed computing system comprising a plurality of computing devices and a target deployment, the allocation of resources comprising used resources operating on live traffic and unused resources that are available for generating testing traffic;

identifying a subset of the plurality of computing devices based on a network bandwidth capacity from the subset of the plurality of computing devices to the target deployment, wherein the subset of the plurality of computing devices is linked to the target deployment, the subset of the plurality of computing devices is associated with an amount of unused resources that is sufficient to satisfy a testing traffic requirement for the target deployment, wherein the testing traffic requirement for the amount of unused resources is independently configurable for network bandwidth capacity and compute capacity for determining that the amount of unused resources satisfies the testing traffic requirement;

allocating, from the subset of the plurality of computing devices, based on the network bandwidth capacity, a first set of source computing devices, wherein the first set of source computing devices is allocated to generate a first network load directed from the first set of source computing devices to the target deployment; and causing a network-traffic generator service at each of the first set of source computing devices to generate the first network load directed from the first set of source computing devices to the target deployment.

20. The computer system of claim 19, wherein the method further comprises, based on a change in the allocation of resources in the geographically-distributed computing system, dynamically selecting a second set of source computing devices for generating a second network load directed from the second set of source computing devices.

* * * * *